United States Patent
Liu et al.

(10) Patent No.: US 12,428,354 B2
(45) Date of Patent: Sep. 30, 2025

(54) METHOD FOR PREPARING NITROGEN-RICH OR NUTRITIOUS SLOW-RELEASE FERTILIZER THROUGH IN-SITU STRAW MODIFICATION/REACTIVE EXTRUSION INTEGRATED CONTINUOUS PROCESS

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Guizhe Zhao, Taiyuan (CN); Yang Xiang, Taiyuan (CN)

(73) Assignees: NORTH UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 765 days.

(21) Appl. No.: 17/828,589

(22) Filed: May 31, 2022

(65) Prior Publication Data
US 2022/0289639 A1 Sep. 15, 2022

(30) Foreign Application Priority Data
Jan. 27, 2022 (CN) .......................... 202210098981.2

(51) Int. Cl.
C05C 9/02 (2006.01)
C05G 3/40 (2020.01)

(52) U.S. Cl.
CPC . *C05C 9/02* (2013.01); *C05G 3/40* (2020.02)

(58) Field of Classification Search
CPC .... C05C 9/02; C05G 3/40; C05G 5/12; C05B 7/00
See application file for complete search history.

(56) References Cited

U.S. PATENT DOCUMENTS 6,500,371 B1 * 12/2002 Berbner ................. B29B 7/007
264/204

FOREIGN PATENT DOCUMENTS

| CN | 100522894 C | 8/2009 |
| CN | 106396809 A * | 2/2017 |
| CN | 106478256 A | 3/2017 |

* cited by examiner

*Primary Examiner* — Jennifer A Smith

(57) ABSTRACT

Disclosed is a method for preparing a nitrogen-rich or nutritious straw-based slow-release fertilizer through In-Situ straw modification/reactive extrusion integrated continuous process. In the method, the liquid reaction precursor of a nitrogen-containing biodegradable slow-release fertilizer is mixed with crop straw to obtain a reaction mixture, or the liquid reaction precursor of a nitrogen-containing biodegradable slow-release fertilizer, crop straw and a soluble fertilizer are mixed to obtain a reaction mixture. The reaction mixture is subjected to extrusion in a screw extruder to produce the nitrogen-rich or nutritious straw-based slow-release fertilizer.

11 Claims, 4 Drawing Sheets

METHOD FOR PREPARING NITROGEN-RICH OR NUTRITIOUS SLOW-RELEASE FERTILIZER THROUGH IN-SITU STRAW MODIFICATION/REACTIVE EXTRUSION INTEGRATED CONTINUOUS PROCESS

CROSS-REFERENCE TO RELATED APPLICATIONS

This application claims the benefit of priority from Chinese Patent Application No. 202210098981.2, filed on Jan. 27, 2022. The content of the aforementioned applications, including any intervening amendments thereto, is incorporated herein by reference in its entirety.

TECHNICAL FIELD

This application relates to biodegradable polymer materials, and more particularly to a method for preparing a nitrogen-rich or nutritious slow-release fertilizer through an in-situ straw modification/reactive extrusion integrated continuous process.

BACKGROUND

As a predominant agricultural country, China's annual straw production reaches about $9\times10^8$ t, accounting for 20-30% of the world's total straw production. Several measures and technologies have been developed to make full use of straw and enable the sustainable development of agriculture, for example, the straw can be processed into feed, base material, fertilizer, energy, and industrial raw material. At present, regarding the total straw production in China, about 30.69% is processed into feed; about 2.14% is processed into base material; about 14.78% is processed into fertilizer; about 18.72% is processed into energy; 2.37% is consumed for paper making; and about 31.31% is discarded or burned.

Crop straw is nutritious and can improve the nutrient content, organic matter content and fertility after returning to the field. In addition, the fertilizer utilization of straw can be realized by improving the soil aggregate structure, reducing the amount of chemical fertilizer and increasing the output of agricultural products. The straw returning strategies mainly include direct returning, indirect returning and returning after biochemical decomposition. (1) With respect to the direct returning to the field, the crop straw is crushed and then directly applied to the field, and the crop straw would gradually decay after being mixed with the soil, improving the soil fertility. This mode has convenient operation, high efficiency and low consumption, and is widely used, but struggles with limited fertility improvement and secondary hazards during the decomposition process, such as competitive nitrogen utilization with the crop, generation of organic acids, and occurrence of pests and diseases. (2) As for the indirect returning, the crop straw is adopted to raise livestock or used for fermentation, and finally returned to the field in the form of manure or digestate. This approach has an improved utilization efficiency of crop straw. (3) In the third strategy, the crop straw is subjected to microbial fermentation and composted into organic fertilizer, and then returned to the field. Whereas, there is often a mismatch between the time of the fertilizer production and the time of the concentrated use of the fertilizer, which probably results in the large accumulation of the organic fertilizer, seriously restricting the commercialization of straw-derived organic fertilizers.

Crop straw is mainly composed of cellulose, hemicellulose and lignin. The cellulose and hemicellulose are linked by hydrogen bonds, and cellulose molecules are also linked by hydrogen bonds, forming a huge hydrogen bond network. The hemicellulose and lignin are linked by chemical bonds such as ester bonds and ether bonds to form a network structure, in which the cellulose is wrapped. The cellulose, hemicellulose and lignin are intricately cross-linked to form a dense and stable three-dimensional structure, making lignocellulose highly resistant to external biodegradation or abiotic damage. Hence, the crop straw is required to be modified by pretreatment to deconstruct its dense network and change the micro- and macro-structure and chemical composition of lignocellulose, making it susceptible to microbial or enzymatic degradation. The bioconversion cost of the lignocellulose is predominated by the pretreatment cost, and the pretreatment is closely associated with the efficient utilization of crop straw. Currently, the crop straw is modified mainly by physical method, chemical method, biological method or a combination thereof to improve the bioavailability and degradability of the cellulose. Regarding the selection of the modification strategy, several factors are often taken into consideration: whether the modification conditions are simple and feasible; whether the modification method has improved efficiency and shortened modification cycle; whether the modification method will influence the subsequent utilization; cost and economic benefits.

Reactive extrusion is a process in which a screw extruder is employed as a reactor for the simultaneous physical and chemical reactions of monomer or polymer melt to prepare polymerization products or modified polymers directly. Since the reactive extrusion has diverse mixing forms, easy cleaning, excellent product quality, high production efficiency, high automation level, strong controllability, low cost, good operation environment and high profit, and is suitable for large-scale production, it has received extensive attention at home and abroad.

SUMMARY

Accordingly, the present disclosure provides a method for preparing a nitrogen-rich or nutritious slow-release fertilizer through an In-Situ straw modification/reactive extrusion integrated continuous process. The prepared slow-release fertilizer can not only slowly release nutrients during the degradation process, but also effectively improve soil fertility and soil quality. In addition, the process has simple operation and low cost.

Technical solutions of the present disclosure are described as follows.

In a first aspect, this application provides a method for preparing a nitrogen-rich straw-based slow-release fertilizer through an in-situ straw modification/reactive extrusion integrated continuous process, comprising:

mixing a liquid reaction precursor of a nitrogen-containing biodegradable slow-release fertilizer with a straw pellet; and subjecting a mixture of the liquid reaction precursor and the straw pellet to extrusion using a reaction-extrusion machine to produce the nitrogen-rich straw-based slow-release fertilizer, wherein during the extrusion, the mixture in a barrel of the reaction-extrusion machine is pushed to move forward under rotation of a screw, sheared and extruded at the same time, and heated under a combined action of frictional heat and an external heat source, such that cellulose of the straw pellet is swollen and partially degraded; hemicellulose of the straw pellet is degraded into oligosaccharides, and lignin of the straw pellet is plasticized and partially degraded; and the liquid reaction precursor of the nitrogen-containing biodegradable slow-release fertilizer undergoes an in-situ reaction on surfaces of cellulose and lignin fragments, and on surfaces and between molecular chains of cellulose, lignin and hemicellulose degradation products to generate the nitrogen-containing biodegradable slow-release fertilizer, so as to obtain the nitrogen-rich straw-based slow-release fertilizer.

In some embodiments, the liquid reaction precursor is hydroxymethylurea; and the nitrogen-containing biodegradable slow-release fertilizer is urea-formaldehyde.

In a second aspect, this application provides a method for preparing a nutritious straw-based slow-release fertilizer through an in-situ straw modification/reactive extrusion integrated continuous process, comprising:
  mixing a liquid reaction precursor of a nitrogen-containing biodegradable slow-release fertilizer, a straw pellet and a soluble fertilizer to obtain a mixture; and
  subjecting the mixture to extrusion using a reaction-extrusion machine to produce the nutritious straw-based slow-release fertilizer, wherein during a process of the extrusion, a macromolecular nitrogen-containing biodegradable slow-release fertilizer is generated, and the soluble fertilizer is crystallized out as water evaporates and then embedded between cellulose and lignin fragments, between degradation products of cellulose, lignin and hemicellulose, between molecular chains of the macromolecular nitrogen-containing biodegradable slow-release fertilizer and between molecular chains of the macromolecular nitrogen-containing biodegradable slow-release fertilizer and the degradation products of cellulose, lignin and hemicellulose to form the nutritious straw-based slow-release fertilizer.

In some embodiments, the liquid reaction precursor is hydroxymethylurea; and the nitrogen-containing biodegradable slow-release fertilizer is urea-formaldehyde.

In a third aspect, this application provides a method for preparing a nitrogen-rich straw-based slow-release fertilizer through an in-situ straw modification/reactive extrusion integrated continuous process, comprising:
  (S1) mixing formaldehyde with urea in a certain proportion followed by pH adjustment and reaction to obtain a hydroxymethylurea solution;
  (S2) sealing a die opening of a reaction-extrusion machine; mixing the hydroxymethylurea solution with a straw pellet evenly to obtain a reaction mixture; and feeding the reaction mixture to the reaction-extrusion machine;
  (S3) starting a screw of a reaction unit of the reaction-extrusion machine; reacting the reaction mixture at a preset temperature and a preset rotation speed of the reaction-extrusion machine, and starting a vacuumizing unit of the reaction-extrusion machine to remove water vapor until the reaction mixture becomes viscous enough to extrude a continuous extrudate;
  (S4) opening the die opening of the reaction-reaction extruder; and starting an extruding unit of the reaction-extrusion machine to extrude the reaction mixture to obtain a strip extrusion product; and
  (S5) drying the strip extrusion product followed by pelleting to obtain the nitrogen-rich straw-based slow-release fertilizer.

In a fourth aspect, this application provides a method for preparing a nutritious straw-based slow-release fertilizer through an in-situ straw modification/reactive extrusion integrated continuous process, comprising:
  (S1) mixing formaldehyde with urea in a certain proportion followed by pH adjustment and reaction to obtain a hydroxymethylurea solution;
  (S2) sealing a die opening of a reaction-extrusion machine; mixing the hydroxymethylurea solution, a crop straw pellet and a soluble fertilizer evenly to obtain a reaction mixture; and feeding the reaction mixture to the reaction-extrusion machine;
  (S3) starting a screw of a reaction unit of the reaction-extrusion machine; reacting the reaction mixture at a preset temperature and a preset rotation speed of the reaction-extrusion machine, and starting a vacuumizing unit of the reaction-extrusion machine to remove water vapor until the reaction mixture becomes viscous;
  (S4) opening the die opening of the reaction-extrusion machine; and starting an extruding unit of the reaction-extrusion machine to extrude the reaction mixture to obtain a strip extrusion product; and
  (S5) drying the strip extrusion product followed by pelleting to obtain the nutritious straw-based slow-release fertilizer.

In some embodiments, in step (S1) of the above-mentioned two methods, a molar ratio of the formaldehyde to the urea is 1:(1-10).

In some embodiments, in step (S2) of the above-mentioned two methods, the soluble fertilizer is selected from the group consisting of phosphorus fertilizer, potassium fertilizer, calcium fertilizer, magnesium fertilizer, sulfur fertilizer, silicon fertilizer, trace element fertilizer and a combination thereof.

In some embodiments, in step (S3) of the above-mentioned two methods, the preset temperature of the reaction-extrusion machine is set to 25-200° C.

In some embodiments, in step (S3) of the above-mentioned two methods, the preset rotation speed of the reaction-extrusion machine is larger than 0 and not larger than 400 RPM.

In some embodiments, a content of nitrogen in the nitrogen-rich straw-based slow-release fertilizer is capable of reaching 45 wt. %.

Compared to the prior art, this application has the following beneficial effects.

(1) In the preparation method provided herein, a reaction precursor hydroxymethylurea is mixed with crop straw and subjected to extrusion in the screw extruder at a controlled temperature to obtain a straw-based slow-release fertilizer (crop straw/urea-formaldehyde, CS/UF), where the hydroxymethylurea undergoes condensation polymerization to produce the nitrogen-containing biodegradable slow-release fertilizer urea-formaldehyde. Compared with a co-blended fertilizer CS+UF obtained by directly mixing UF with CS, the CS/UF has better dispersion of CS and UF and better compatibility between CS and UF, and thus has superior performance.

(2) The preparation method provided herein has reduced consumption of reagents, shortened production period and simplified process. In addition, the defect in the prior art that only a specific component is extracted from the crop straw for use while the rest of the crop straw is discarded as pollutants, is overcome, enabling the efficient and comprehensive utilization of plant-based resources.

(3) The nutritious straw-based slow-release fertilizer contains various essential nutrients for crop growth and development, and can significantly promote the crop yield when applied alone. Moreover, the elemental composition of the nutritious slow-release fertilizer can be easily adjusted to meet the needs of different plants.

(4) The present disclosure has a simple and efficient process, which facilitates reducing the labor intensity and material and production cost, which is suitable for industrial production.

BRIEF DESCRIPTION OF THE DRAWINGS

Technical solutions of the present disclosure and the prior art will be described below with reference to the accompanying drawings to facilitate the understanding. Obviously, illustrated in the accompanying drawings are merely some embodiments of the present disclosure, which are not intended to limit the disclosure. Other drawings can be obtained by those skilled in the art based on the drawings provided herein without paying creative effort.

DETAILED DESCRIPTION OF EMBODIMENTS

Figure 1:
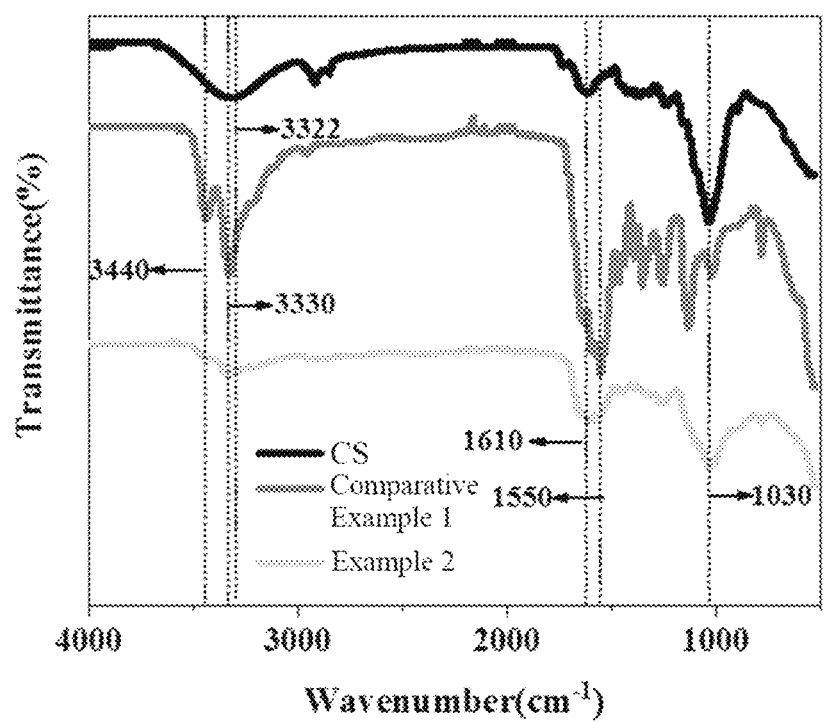
FIG. 1 shows Fourier Transform Infrared (FTIR) spectra of a crop straw/urea-formaldehyde/potassium dihydrogen phosphate slow-release fertilizer (CS/UF/MKP) in Example 2, a UF/MKP slow-release fertilizer in Comparative Example 1 and CS.

Technical solutions of the present disclosure and the prior art will be described below with reference to the accompanying drawings and embodiments to facilitate the understanding. Obviously, described below are merely some embodiments of the present disclosure, which are not intended to limit the disclosure. Other embodiments obtained by those skilled in the art based on the embodiments provided herein without paying creative effort should fall within the scope of the disclosure.

Example 1

Provided herein was a method for preparing a nitrogen-rich straw-based slow-release fertilizer through the in-situ straw modification/reactive extrusion integrated continuous process, which was performed as follows.

(S1) 113.47 g of formaldehyde and 168 g of urea were mixed, adjusted to pH 10, and reacted at 60° C. for 2 h to obtain a hydroxymethylurea solution.

(S2) The hydroxymethylurea solution prepared in step (S1) and 58.05 g of crop straw pellets were mixed uniformly to obtain a mixture; a die opening of a reaction-extrusion machine was sealed, and the mixture was fed to the reaction-extrusion machine.

(S3) The screw of the reaction unit of the reaction-extrusion machine was started, and zones of the reaction unit were respectively set to 160° C., 160° C., 170° C. and 170° C. The reaction mixture was reacted under a rotation speed of 120 RPM, and at the same time, a vacuumizing unit of the reaction-extrusion machine was started to remove water vapor until the reaction mixture became viscous.

(S4) The die opening was opened, and the extruding unit of the reaction-extrusion machine was started to extrude the reaction mixture to obtain a strip product.

(S5) The strip product was dried at 60° C. and then pelleted to obtain the nitrogen-rich straw-based slow-release fertilizer.

The analysis results demonstrated that the nitrogen-rich straw-based slow-release fertilizer provided herein contained 21.66 wt. % of the straw and 29.22 wt. % of element N.

Example 2

Provided herein was a method for preparing a nutritious straw-based slow-release fertilizer through the in-situ straw modification/reactive extrusion integrated continuous process, which was performed as follows.

(S1) 16.21 g of formaldehyde and 24 g of urea were mixed, adjusted to pH 10, and reacted at 60° C. for 2 h to obtain a hydroxymethylurea solution.

(S2) The hydroxymethylurea solution prepared in step (S1), 58.05 g of crop straw pellets and 10.8 g of MKP were mixed uniformly to obtain a mixture; a die opening of a reaction-extrusion machine was sealed, and the mixture was fed to the reaction-extrusion machine.

(S3) The screw of the reaction unit of the reaction-extrusion machine was started, and zones of the reaction unit were respectively set to 160° C., 160° C., 170° C. and 170° C. The reaction mixture was reacted under a rotation speed of 120 RPM, and at the same time, a vacuumizing unit of the reaction-extrusion machine was started to remove water vapor until the reaction mixture became viscous.

(S4) The die opening was opened, and the extruding unit of the reaction-extrusion machine was started to extrude the reaction mixture to obtain a strip product.

(S5) The strip product was dried at 70° C. and then pelleted to obtain the nutritious straw-based slow-release fertilizer.

The analysis results demonstrated that the nutritious straw-based slow-release fertilizer provided herein contained 58.73 wt. % of the straw, 11.32 wt. % of element N, 11.14 wt. % of element P (in $P_2O_5$) and 7.40 wt. % of element K (in $K_2O$).

Example 3

Provided herein was a method for preparing a nutritious straw-based slow-release fertilizer through the in-situ straw modification/reactive extrusion integrated continuous Process, which was performed as follows.

(S1) 32.48 g of formaldehyde and 48 g of urea were mixed, adjusted to pH 10, and reacted at 60° C. for 2 h to obtain a hydroxymethylurea solution.

(S2) The hydroxymethylurea solution prepared in step (S1), 58.05 g of crop straw pellets and 21.6 g of MKP were mixed uniformly to obtain a mixture; a die opening of a reaction-extrusion machine was sealed, and the mixture was fed to the reaction-extrusion machine.

(S3) The screw of the reaction unit of the reaction-extrusion machine was started, and zones of the reaction unit were respectively set to 160° C., 160° C., 170° C. and 170° C. The reaction mixture was reacted under a rotation speed of 120 RPM, and at the same time, a vacuumizing unit of the reaction-extrusion machine was started to remove water vapor until the reaction mixture became viscous.

(S4) The die opening was opened, and the extruding unit of the reaction-extrusion machine was started to extrude the reaction mixture to obtain a strip product.

(S5) The strip product was dried at 70° C. and then pelleted to obtain the nutritious straw-based slow-release fertilizer.

The analysis results demonstrated that the nutritious straw-based slow-release fertilizer provided herein contained 41.56 wt. % of the straw, 16.02 wt. % of element N, 15.78 wt. % of element P (in $P_2O_5$) and 10.47 wt. % of element K (in $K_2O$).

Example 4

Provided herein was a method for preparing a nutritious straw-based slow-release fertilizer through the in-situ straw modification/reactive extrusion integrated continuous process, which was performed as follows.

(S1) 48.63 g of formaldehyde and 72 g of urea were mixed, adjusted to pH 10, and reacted at 60° C. for 2 h to obtain a hydroxymethylurea solution.

(S2) The hydroxymethylurea solution prepared in step (S1), 58.05 g of crop straw pellets and 32.4 g of MKP were mixed uniformly to obtain a mixture; a die opening of a reaction-extrusion machine was sealed, and the mixture was fed to the reaction-extrusion machine.

(S3) The screw of the reaction unit of the reaction-extrusion machine was started, and zones of the reaction unit were respectively set to 160° C., 160° C., 170° C. and 170° C. The reaction mixture was reacted under a rotation speed of 120 RPM, and at the same time, a vacuumizing unit of the reaction-extrusion machine was started to remove water vapor until the reaction mixture became viscous.

(S4) The die opening was opened, and the extruding unit of the reaction-extrusion machine was started to extrude the reaction mixture to obtain a strip product.

(S5) The strip product was dried at 70° C. and then pelleted to obtain the nutritious straw-based slow-release fertilizer.

The analysis results demonstrated that the nutritious straw-based slow-release fertilizer provided herein contained 32.17 wt. % of the straw, 18.60 wt. % of element N, 18.32 wt. % of element P (in $P_2O_5$) and 12.16 wt. % of element K (in $K_2O$).

Comparative Example 1

Provided herein was a method for preparing a UF/MKP slow-release fertilizer, which was performed as follows.

(S1) 16.21 g of formaldehyde and 24 g of urea were mixed, adjusted to pH 10, and reacted at 60° C. for 2 h to obtain a hydroxymethylurea solution.

(S2) The hydroxymethylurea solution prepared in step S1 and 10.8 g of MKP were mixed uniformly to obtain a mixture; a die opening of a reaction-extrusion machine was sealed, and the mixture was fed to the reaction-extrusion machine.

(S3) The screw of the reaction unit of the reaction-extrusion machine was started, and zones of the reaction unit were respectively set to 160° C., 160° C., 170° C. and 170° C. The reaction mixture was reacted under a rotation speed of 120 RPM, and at the same time, a vacuumizing unit of the reaction-extrusion machine was started to remove water vapor until the reaction mixture became viscous.

(S4) The die opening was opened, and the extruding unit of the reaction-extrusion machine was started to extrude the reaction mixture to obtain a strip product.

(S5) The strip product was dried at 70° C. and then pelleted to obtain the UF/MKP slow-release fertilizer.

The analysis results demonstrated that the UF/MKP slow-release fertilizer contained 27.42 wt. % of element N, 27.61 wt. % of element P (in $P_2O_5$) and 17.93 wt. % of element K (in $K_2O$).

FIG. 1 shows FTIR spectra of a crop straw/urea-formaldehyde/potassium dihydrogen phosphate slow-release fertilizer (CS/UF/MKP) in Example 2, a UF/MKP slow-release fertilizer in Comparative Example 1 and CS. In the FTIR spectrum of UF/MKP, a peak at 3440 $cm^{-1}$ is assigned to the stretching vibration of N—H of primary amide; a peak at 3330 $cm^{-1}$ is assigned to the stretching vibration of N—H of secondary amide; a peak at 1550 $cm^{-1}$ is assigned to the bending vibration of N—H in the amide group; and a peak at 1610 $cm^{-1}$ is assigned to the stretching vibration of C=O in the amide group; in the FTIR spectrum of the CS, a peak at 3322 $cm^{-1}$ is assigned to the stretching vibration of O—H of a hydroxyl group of cellulose; a peak at 1610 $cm^{-1}$ is assigned to the stretching vibration of C=O of ketone, aldehyde and carboxylic group of lignin; and a peak at 1030 $cm^{-1}$ is assigned to the stretching vibration of β-1,4 glycosidic bond of cellulose; the FTIR spectrum of the CS/UF/MKP includes all characteristic peaks of the UF/MKP and the CS; and compared to the FTIR spectrum of the CS, the intensity of the peak at 1030 $cm^{-1}$ (assigned to the stretching vibration of the β-1,4 glycosidic bond of cellulose and hemicellulose) in the FTIR spectrum of the CS/UF/MKP is reduced significantly, indicating that the lignocellulose has been structurally broken.

Figure 2A:
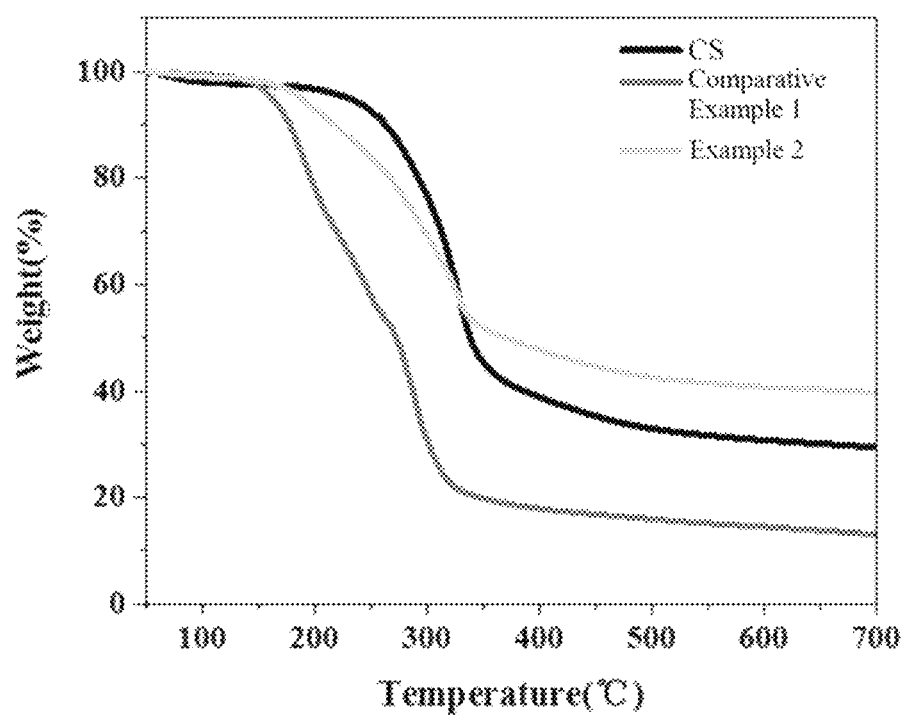
FIG. 2A shows thermogravimetric (TG) curves of the CS/UF/MKP in Example 2, the UF/MKP in Comparative Example 1 and the CS.
Figure 2B:
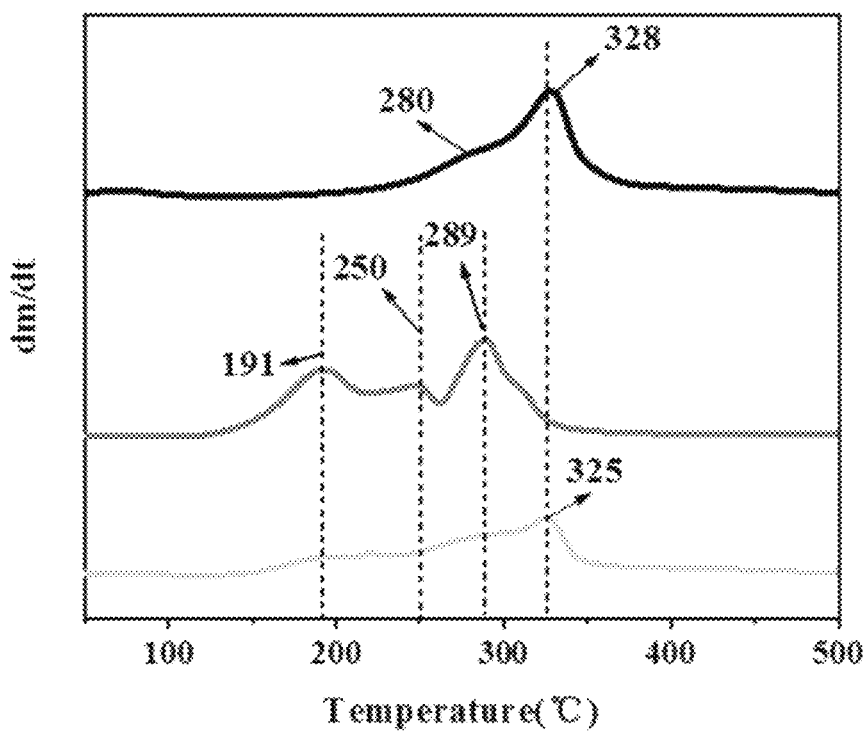
FIG. 2B shows derivative thermogravimetric (DTG) curves of the CS/UF/MKP in Example 2, the UF/MKP in Comparative Example 1 and the CS.

Referring to FIGS. 2A and 2B, regarding the CS, the thermal weight loss at 225-325° C. is attributed to the thermal decomposition of hemicellulose in the crop straw, and the thermal weight loss at 325-375° C. is attributed to the thermal decomposition of cellulose in the crop straw; for the UF/MKP, the thermal weight loss at 117-220° C. is attributed to the moisture volatilization, thermal decomposition of unreacted urea and UF oligomer; the thermal weight loss at 220-265° C. is attributed to the thermal decomposition of a terminal amide group of the UF molecular chain; and the thermal weight loss at 265-330° C. is attributed to the thermal decomposition of a UF main molecular chain; for the CS/UF/MKP, thermogravimetric peaks of the CS and UF/MKP are observed, and the cellulose DTG peak of the CS shifts to the lower temperature zone, indicating that the UF molecular chain inserts into the hydrogen bond network of the cellulose of CS and the hydrogen bond network is partially destroyed; and the TG and DTG curves indicate that the CS/UF/MKP is successfully prepared and the structure of lignocellulose is destroyed.

Figure 3:
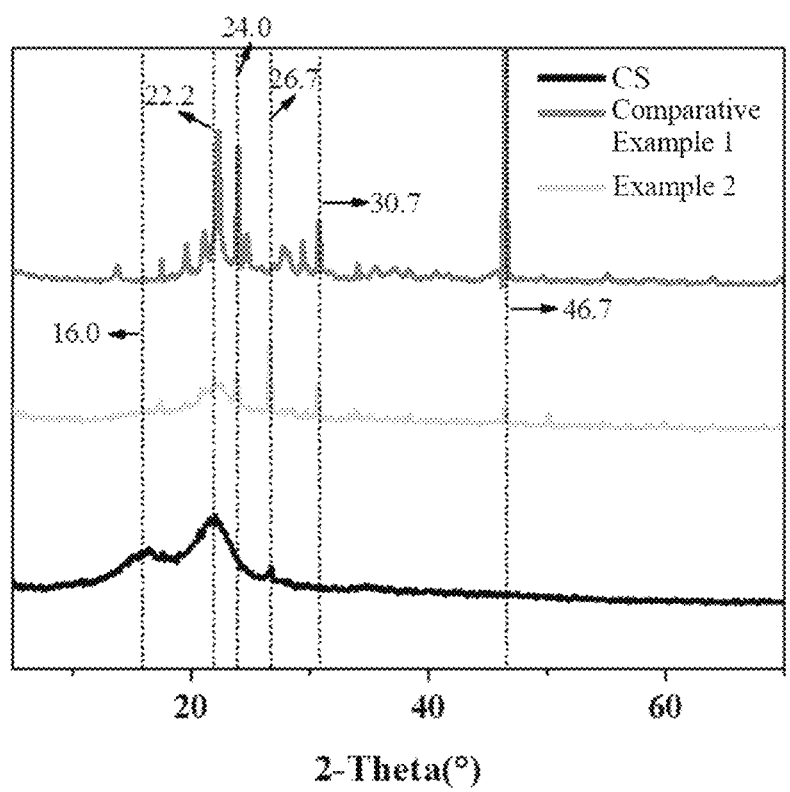
FIG. 3 shows X-ray diffraction (XRD) patterns of the CS/UF/MKP in Example 2, the UF/MKP in Comparative Example 1 and the CS.

Referring to FIG. 3, peaks at 16.0°, 22.2° and 26.7° are assigned to the crystallization peaks of cellulose in the crop straw; peaks at 24.0°, 30.7° and 46.7° are assigned to the crystallization peaks of UF; the crystallization peaks of the straw and the UF are also observed in the XRD pattern of the CS/UF/MKP; under the action of UF, the crystallization peaks of CS decrease to a certain extent, indicating that the UF inserts between the straw molecules and some of the hydrogen bonds of the straw are destroyed; and the XRD results indicate that the CS/UF/MKP is successfully prepared and the structure of lignocellulose is destroyed.

Figure 4A:
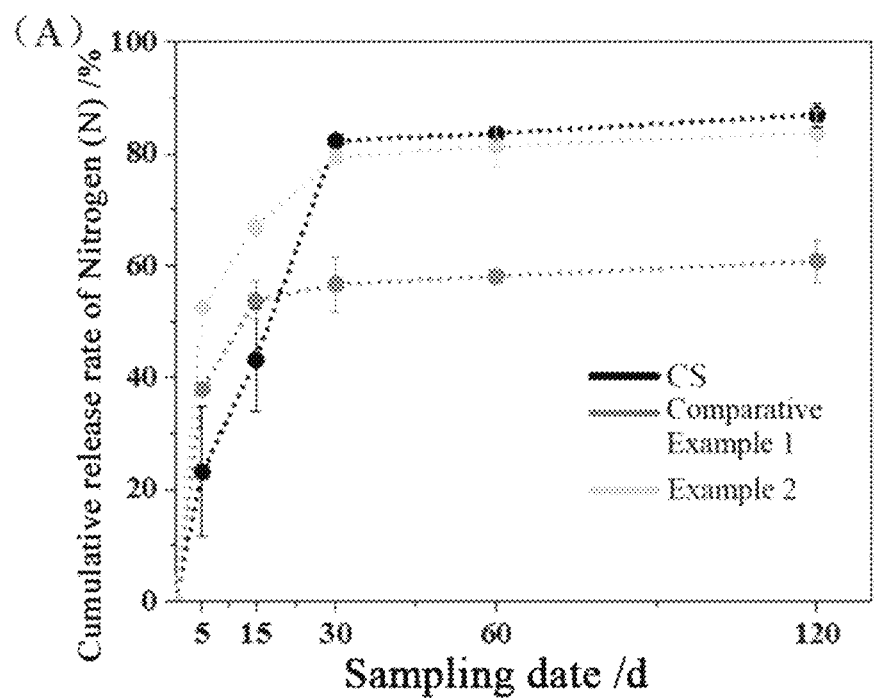
FIG. 4A shows nitrogen (N)-release curves of the CS/UF/MKP in Example 2, the UF/MKP in Comparative Example 1 and the CS.

Referring to FIG. 4A, the CS/UF/MKP experiences the most stable N release during the whole test period; the N release from the CS is too slow in the first 30 days, which might lead to insufficient fertilizer supply in the early plant growth; the cumulative N release rate of the CS/UF/MKP is significantly higher than that of the UF/MKP which is due to the fact that the CS in the CS/UF/MKP significantly destroys the crystallinity of the UF, promoting the N release from the UF; and in the presence of the CS, the N release is improved from 60.87% to 83.72%, indicating that the introduction of the CS can increase the effective N level of the UF.

Figure 4B:
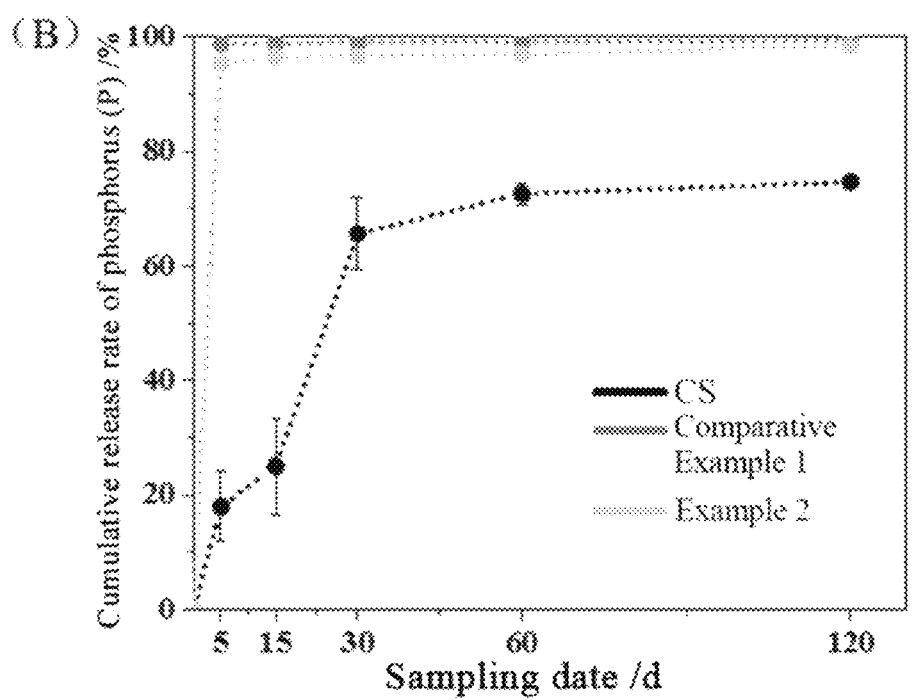
FIG. 4B shows phosphorus (P)-release curves of the CS/UF/MKP in Example 2, the UF/MKP in Comparative Example 1 and the CS.

Referring to FIG. 4B, a cumulative P release rate of the CS/UF/MKP is lower than that of the UF/MKP which is explained by the fact that the physical blocking effect of cellulose molecular chains in the CS further delays the P release rate from the MKP; and the results demonstrate that the introduction of the CS can improve the slow release of N and P from the UF/MKP.

Described above are only some embodiments of the present disclosure, which are not intended to limit the disclosure. It should be understood that any modifications and replacements made by those of ordinary skilled in the art without departing from the spirit of the disclosure shall fall within the scope of the disclosure defined by the appended claims.

What is claimed is:

1. A method for preparing a nitrogen-rich straw-based slow-release fertilizer through an in-situ straw modification/reactive extrusion integrated continuous process, comprising:

mixing a liquid reaction precursor of a nitrogen-rich straw-based slow-release fertilizer with a straw pellet; and subjecting a mixture of the liquid reaction precursor and the straw pellet to extrusion using a reaction-extrusion machine to produce the nitrogen-rich straw-based slow-release fertilizer, wherein during the extrusion, the mixture in a barrel of the reaction-extrusion machine is pushed to move forward under rotation of a screw, sheared and extruded at the same time, and heated under a combined action of frictional heat and an external heat source, such that cellulose of the straw pellet is swollen and partially degraded; hemicellulose of the straw pellet is degraded into oligosaccharides, and lignin of the straw pellet is plasticized and partially degraded; and the liquid reaction precursor of the nitrogen-rich straw-based slow-release fertilizer undergoes an in-situ reaction on surfaces of cellulose and lignin fragments and on surfaces and between molecular chains of cellulose, lignin and hemicellulose degradation products to generate the nitrogen-rich straw-based slow-release fertilizer.

2. The method of claim 1, wherein the liquid reaction precursor is hydroxymethylurea; and the nitrogen-rich straw-based slow-release fertilizer is urea-formaldehyde.

3. A method for preparing a nitrogen-rich straw-based slow-release fertilizer through an in-situ straw modification/reactive extrusion integrated continuous process, comprising:

(S1) mixing formaldehyde with urea in a certain proportion followed by pH adjustment and reaction to obtain a hydroxymethylurea solution;

(S2) sealing a die opening of a reaction-extrusion machine; mixing the hydroxymethylurea solution with a straw pellet evenly to obtain a reaction mixture; and feeding the reaction mixture to the reaction-extrusion machine;

(S3) starting a screw of a reaction unit of the reaction-extrusion machine; reacting the reaction mixture at a preset temperature and a preset rotation speed of the reaction-extrusion machine, and starting a vacuumizing unit of the reaction-extrusion machine to remove water vapor until the reaction mixture becomes viscous;

(S4) opening the die opening of the reaction-extrusion machine; and starting an extruding unit of the reaction-extrusion machine to extrude the reaction mixture to obtain a strip extrusion product; and (S5) drying the strip extrusion product followed by pelleting to obtain the nitrogen-rich straw-based slow-release fertilizer.

4. The method of claim 3, wherein in step (S1), a molar ratio of the formaldehyde to the urea is 1:(1-10).

5. The method of claim 3, wherein in step (S3), the preset temperature of the reaction-extrusion machine is set to 25-200° C.

6. The method of claim 3, wherein in step (S3), the preset rotation speed of the reaction-extrusion machine is larger than 0 RPM and not larger than 400 RPM.

7. A method for preparing a nutritious straw-based slow-release fertilizer through an in-situ straw modification/reactive extrusion integrated continuous process, comprising:

(S1) mixing formaldehyde with urea in a certain proportion followed by pH adjustment and reaction to obtain a hydroxymethylurea solution;

(S2) sealing a die opening of a reaction-extrusion machine; mixing the hydroxymethylurea solution, a crop straw pellet and a soluble fertilizer evenly to obtain a reaction mixture; and feeding the reaction mixture to the reaction-extrusion machine;

(S3) starting a screw of a reaction unit of the reaction-extrusion machine; reacting the reaction mixture at a preset temperature and a preset rotation speed of the reaction-extrusion machine, and starting a vacuumizing unit of the reaction-extrusion machine to remove water vapor until the reaction mixture becomes viscous;

(S4) opening the die opening of the reaction-extrusion machine; and starting an extruding unit of the reaction-extrusion machine to extrude the reaction mixture to obtain a strip extrusion product; and (S5) drying the strip extrusion product followed by pelleting to obtain the nutritious straw-based slow-release fertilizer.

8. The method of claim 7, wherein in step (S1), a molar ratio of the formaldehyde to the urea is 1:(1-10).

9. The method of claim 7, wherein in step (S2), the soluble fertilizer is selected from the group consisting of phosphorus fertilizer, potassium fertilizer, calcium fertilizer, magnesium fertilizer, sulfur fertilizer, silicon fertilizer, trace element fertilizer and a combination thereof.

10. The method of claim 7, wherein in step (S3), the preset temperature of the reaction-extrusion machine is set to 25-200° C.

11. The method of claim 7, wherein in step (S3), the preset rotation speed of the reaction-extrusion machine is larger than 0 and not larger than 400 RPM.

* * * * *